Oct. 29, 1929.  A. L. MAYS ET AL  1,733,690
COMBINED PLUG AND WRENCH
Filed March 1, 1928
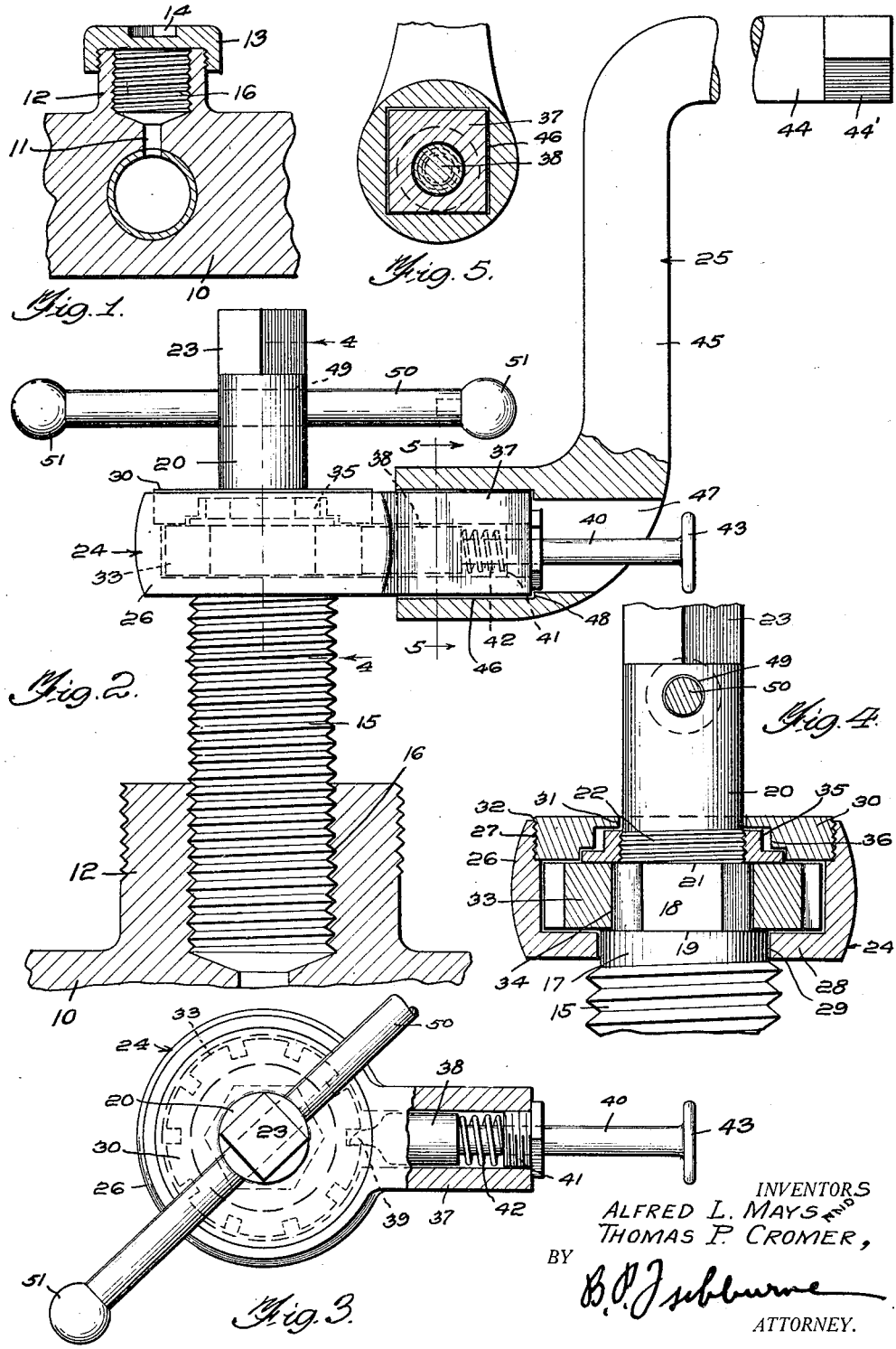
INVENTORS
ALFRED L. MAYS AND
THOMAS P. CROMER,
BY
ATTORNEY.

Patented Oct. 29, 1929

1,733,690

UNITED STATES PATENT OFFICE

ALFRED L. MAYS AND THOMAS P. CROMER, OF FLORENCE, SOUTH CAROLINA

COMBINED PLUG AND WRENCH

Application filed March 1, 1928. Serial No. 258,381.

Our invention is a combined plug and wrench.

As is well known, very heavy grease is employed to lubricate the bearings upon railway locomotives. Parts of the locomotive, adjacent to the bearings, are equipped with grease cups, which are adapted to be filled with the heavy grease. The grease is forced to the bearings from the grease cup by means of a plug having screw-threaded engagement within the grease cup. These plugs are turned by means of an ordinary wrench. It frequently happens that the grease is so stiff, particularly in cold weather, that the plug can not be turned by an ordinary wrench, or if turned, the work is very laborious and time consuming.

In accordance with our invention, we provide a plug which is permanently connected with a ratchet wrench, having a long handle, for providing proper leverage to turn the plug. The construction of the wrench element is such that the plug may be turned, when placed in positions, upon the locomotive, where it would be ordinarily difficult to turn the same, by means of the usual wrench.

In the accompanying drawings forming a part of this specification, and in which like numerals are employed to designate like parts throughout the same, Figure 1 is a longitudinal section through a grease cup of a locomotive, Figure 2 is a side elevation of a combined plug and ratchet wrench, parts in section, Figure 3 is a plan view of the device, the handle being removed from the ratchet element, Figure 4 is a longitudinal section taken on line 4—4 of Figure 2, and, Figure 5 is a transverse section taken on line 5—5 of Figure 2.

In the drawings, wherein for the purpose of illustration, is shown a preferred embodiment of our invention, the numeral 10 designates a bearing of a railway locomotive, receiving grease from a port 11, leading to a grease cup 12. This grease cup is provided with the usual cap 13, having a square recess 14, in its top, to turn the same.

Our combined plug and ratchet wrench embodies a plug 15, which is screw-threaded, for engagement with the internal screw-threads 16, of the grease cup 12. This plug 15 is provided at its outer end with a cylindrical portion 17, and a polygonal portion 18, these parts being formed integral. The polygonal portion is smaller than the cylindrical portion 17, affording a shoulder 19. Formed integral with the polygonal portion 18 is a cylindrical shank 20, of smaller diameter, than the polygonal portion 18, affording a shoulder 21. The shank 20 is provided at its base with a screw-threaded portion 22, having a slightly larger diameter than the major portion of the length of the shank 20. At its outer end, the shank 20 has a square portion 23, adapted to be inserted within the recess 14, of the cap 13.

Permanently attached to the plug 15 is a pawl and ratchet wrench, embodying a ratchet device 24, and a handle 25. This ratchet device embodies a rotatable casing or housing 26, having one side open and provided with internal screw-threads 27. The opposite side of the housing 26 is closed by a head 28, having a cylindrical opening 29, to rotatably receive the cylindrical portion 17. The numeral 30 designates a head or end to close the open side of the housing 26, and having a circular opening 31, to receive the cylindrical shank 20. The head 30 has its periphery screw-threaded, at 32, for engagement with the screw-threads 27.

The numeral 33 designates a ratchet or toothed wheel, having an opening 34, which is polygonal, to receive the polygonal portion 18. The ratchet wheel is held in place by engagement between the shoulder 19, and a ring nut 35, engaging the screw-threads 22, and fitting within a recess 36, in the head 30. It is thus seen that the toothed wheel 33 is connected with the plug 15, for rotation therewith, and is incapable of moving longitudinally with relation to the same. The housing 26 is permanently rotatably connected with the plug 15, and rotates about the toothed wheel.

Formed integral with the housing 26, and extending radially thereof, is a sleeve 37, within which is mounted to slide a pawl or dog 38, having a tooth 39, to engage with the teeth of the wheel 33. The dog 38 is rigidly connected with a shank 40 slidably mounted within a bushing 41, which is screwed into the outer end of the sleeve 37. A spring 42 surrounds the shank 40 and forces the dog 38 inwardly. The shank 40 is provided at its outer end with a button 43, whereby the shank may be shifted longitudinally and turned upon its longitudinal axis, so that the tooth 39 may be reversed, for effecting the rotation of the wheel 30 in opposite directions.

The handle 25 is laterally offset and the long portion 44 is provided with a transverse portion 45, which is provided at its free end with a socket 46, square in cross section, to receive the sleeve 37, which is square in cross section. The socket 46 has a reduced opening 47, affording a shoulder 48, and the shank 40 extends through the opening 47, so that the button 43 may be manipulated without the necessity of removing the socket 46 from the sleeve 37. The handle 25 is provided at its outer end with a square portion 44', which may be inserted within the recess 14 of the cap 13.

The shank 20 is provided with a transverse opening 49, receiving a radial handle 50, provided at its ends with the usual knobs 51.

In the use of the combined plug and wrench, the cap 13 is removed from the grease cup, and the plug 15 screwed into the outer end of the grease cup. The handle 25 may be separated from the ratchet device 24, and the initial turning or screwing in of the plug 15 may be effected by the handle 50. When increased resistance is applied to the movement of the plug 15, by the grease, the handle 25 has its socket 46 applied to the sleeve 37, and the handle is swung back and forth to cause the dog 38 to effect a step-by-step turning movement of the wheel 33, which turns the plug 15, to screw the same into the grease cup. The handle 25 may be of any suitable length to provide the required leverage to turn the plug 15. To unscrew the plug, the handle 25 may remain upon the sleeve 37 and the button 43 manipulated to reverse the pawl or dog 39 so that the ratchet wheel 33 may turn in a reverse direction. The offset arrangement of the handle renders it possible for the handle to be employed in turning the plug, when the plug is locked in positions which would be otherwise inaccessible.

It is to be understood that the form of our invention, herewith shown and described, is to be taken as a preferred example of the same, and that various changes in the shape, size and arrangement of parts may be resorted to without departing from the spirit of our invention or the scope of the subjoined claims.

Having thus described our invention, we claim:—

1. The combination with a screw-threaded grease cup plug, of a pawl and ratchet device carried by the plug, and a lever detachably connected with said device.

2. The combination with a screw-threaded grease cup plug, of a pawl and ratchet device permanently attached to the plug, a shank secured to the pawl to reverse it, a lever having a socket to engage with a part of said device, said socket having an opening through which the shank extends, said lever being laterally offset.

3. A lubricating device comprising a grease cup, a screw-threaded plug for operation within the grease cup, a toothed wheel rigidly mounted upon the plug, a housing rotatably mounted upon the plug and receiving the toothed wheel, a sleeve rigidly mounted upon the housing and extending radially therefrom, a spring-pressed dog mounted within the sleeve and engaging the toothed wheel and embodying a shank extending radially beyond the sleeve, and a handle having a socket arranged at an angle thereto, the bore of the socket extending through its inner and outer ends, a socket being adapted to be detachably mounted upon said sleeve and said shank extending through and beyond the outer end of the bore whereby it is accessible.

4. A lubricating device comprising a grease cup, a screw-threaded plug operating therein, a shank secured to the outer end of the plug, a toothed wheel rigidly mounted upon the inner end of the shank with the shank extending outwardly beyond the toothed wheel for a substantial distance, a housing rotatably mounted about the toothed wheel, a radial sleeve carried by the housing, a spring-pressed dog mounted within the sleeve to engage with the toothed wheel and embodying a radially extending shank, a lever having a socket arranged at an angle thereto, said socket having the opposite ends of its bore open, said socket detachably receiving the sleeve and the radial shank extending through and beyond the bore so that it may be readily accessible, and separate means to turn the shank carried by the outer end of the plug.

In testimony whereof we affix our signatures.

ALFRED L. MAYS.
THOMAS P. CROMER.